US011461593B2

(12) United States Patent
Tuor et al.

(10) Patent No.: US 11,461,593 B2
(45) Date of Patent: Oct. 4, 2022

(54) FEDERATED LEARNING OF CLIENTS

(71) Applicant: INTERNATIONAL BUSINESS MACHINES CORPORATION, Armonk, NY (US)

(72) Inventors: Tiffany Tuor, London (GB); Shiqiang Wang, White Plains, NY (US); Changchang Liu, White Plains, NY (US); Bong Jun Ko, Harrington Park, NJ (US); Wei-Han Lee, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 16/695,268

(22) Filed: Nov. 26, 2019

(65) Prior Publication Data

US 2021/0158099 A1    May 27, 2021

(51) Int. Cl.
*G06K 9/62*         (2022.01)
*G06Q 10/10*        (2012.01)
(Continued)

(52) U.S. Cl.
CPC ......... *G06K 9/6259* (2013.01); *G06K 9/6267* (2013.01); *G06N 3/049* (2013.01); *G06N 3/08* (2013.01); *G06Q 10/103* (2013.01)

(58) Field of Classification Search
CPC .... G06K 9/6259; G06K 9/6267; G06N 3/049; G06N 3/08; G06Q 10/103
See application file for complete search history.

(56) References Cited

U.S. PATENT DOCUMENTS

| 11,227,050 B1 * | 1/2022 | Gates .................... G06F 21/56 |
| 11,334,801 B2 * | 5/2022 | Zhang ................... G06N 5/022 |

(Continued)

FOREIGN PATENT DOCUMENTS

| WO | 2018057302 A1 | 3/2018 | |
| WO | WO-2021018370 A1 * | 2/2021 | .......... G06N 3/0472 |
| WO | WO-2021080577 A1 * | 4/2021 | ......... G06F 21/6254 |

OTHER PUBLICATIONS

Bonawitz, Keith, et al. "Towards federated learning at scale: System design." Proceedings of Machine Learning and Systems 1 (2019): 374-388. (Year: 2019).*

(Continued)

*Primary Examiner* — Utpal D Shah
(74) *Attorney, Agent, or Firm* — Steven M. Bouknight

(57) ABSTRACT

A method, a computer program product, and a computer system determine when to perform a federated learning process. The method includes identifying currently available contributors among contributors of a federated learning task for which the federated learning process is to be performed. The method includes determining a usefulness metric of the currently available contributors for respective datasets from each of the currently available contributors used in performing the federated learning process. The method includes, as a result of the usefulness metric of the currently available contributors being at least a usefulness threshold, generating a recommendation to perform the federated learning process with the datasets of the currently available contributors. The method includes transmitting the recommendation to a processing component configured to perform the federated learning process.

20 Claims, 5 Drawing Sheets

(51) Int. Cl.
   G06N 3/04 (2006.01)
   G06N 3/08 (2006.01)

(56) References Cited

U.S. PATENT DOCUMENTS

| | | | |
|---|---|---|---|
| 11,373,115 B2* | 6/2022 | Kopp | G06V 30/194 |
| 2015/0324690 A1 | 11/2015 | Chilimbi | |
| 2019/0050746 A1 | 2/2019 | Sanketi | |
| 2019/0171978 A1 | 6/2019 | Bonawitz | |

OTHER PUBLICATIONS

McMahan, Brendan, et al. "Communication-efficient learning of deep networks from decentralized data." Artificial intelligence and statistics. PMLR, 2017. (Year: 2017).*

Wang, Guan, Charlie Xiaoqian Dang, and Ziye Zhou. "Measure contribution of participants in federated learning." 2019 IEEE International Conference on Big Data (Big Data). IEEE, 2019. (Year: 2019).*

Bonawitz, "Towards Federated Learning at Scale: System Design." (Submitted on Feb. 4, 2019 (v1), last revised Mar. 22, 2019 (this version, v2)), https://arxiv.org/abs/1902.01046, pp. 1-15.

Conway-Jones et al., "Demonstration of Federated Learning in a Resource-Constrained Networked Environment," 2019 IEEE International Conference on Smart Computing (SMARTCOMP), Washington, DC, 2019, pp. 484-486.

Mell et al., "The NIST Definition of Cloud Computing", National Institute of Standards and Technology, Special Publication 800-145, Sep. 2011, pp. 1-7.

Tuor et al., "Distributed Machine Learning in Coalition Environments: Overview of Techniques," 2018 21st International Conference on Information Fusion (FUSION), Cambridge, 2018, pp. 814-821.

Wang et al., "Adaptive Federated Learning in Resource Constrained Edge Computing Systems." Submitted on Apr. 14, 2018 (v1), last revised Feb. 17, 2019 (this version, v3)), https://arxiv.org/abs/1804.05271, pp. 1-20.

Xu et al., "Exploring federated learning on battery-powered devices." In Proceedings of the ACM Turing Celebration Conference—China (ACM TURC '19). ACM, Article 6, 6 pages, 2019.

* cited by examiner

FEDERATED LEARNING OF CLIENTS

GOVERNMENT CONTRACT

This invention was made with government support under W911NF-16-3-0001 awarded by The Army Research Office (ARO). The government has certain rights to this invention.

BACKGROUND

The exemplary embodiments relate generally to federated learning, and more particularly to determining when to perform a federated learning process based on a contribution usefulness and an availability of contributors.

Model generation utilizing a federated learning approach may allow devices and contributors associated with the devices to collaboratively train and learn a global model. The federated learning may be used to train a machine learning algorithm such as a global model (e.g., deep neural network) on a plurality of localized datasets stored in respective local nodes without a need for exchanging data samples. The federated learning approach differs from a traditional centralized machine learning technique where data samples are provided to a single server to process the data for global model training and learning. The federated learning approach also differs from a traditional decentralized approach which is based upon localized data samples being identically distributed.

The federated learning may utilize contributors who participate in the global model training and learning. Under conventional federated learning systems, a contributor only participates in federated learning when the device associated with the contributor is plugged in and is connected to a free wireless connection (e.g., WiFi). Consequently, when the device associated with the contributor does not satisfy these conditions, the contributor temporarily leaves the collaboration of the federated learning until the conditions are again met. In view of the contributors of the federated learning incoming and outgoing at various times, the system performing the federated learning considers when to proceed with processing the data samples from the connected contributors. Furthermore, different contributors may provide different values and overall usefulness of their data samples to the federated learning process. Therefore, the system must face trade-offs in determining when to perform the federated learning process. For example, for a system performing the federated learning that utilizes a centralized server, the server must determine whether to wait for a contributor to re-connect to the collaboration. If the server waits too long, the federated learning process may result in an inadvertent waste of time. If the server proceeds with training without consideration of the currently available (e.g., connected) contributors, the global model may lose contribution from relatively more important contributors who are not connected. This may impact accuracy as well as cause a waste of computational resources.

There have been a variety of conventional approaches to improving an efficiency with which a federated learning process is performed. For example, WO 2018/057302 A1 describes a federated learning system that includes techniques for reducing the communication overhead involving a large number of clients having unreliable network connections and low computational power. The user or contributor then has the option or election as to both if and when the collection, storage, and/or use of the user information is enabled. However, this approach deals with the transmission of data samples from the contributor with no relevance to determining whether the system should continue with the federated learning process or wait for more or other contributors to join nor does the conventional approach consider a usefulness of the data samples of the contributors.

In another example, U.S. Publ. Appln. No. 2015/0324690 describes a distributed machine learning system with asynchronous updates. This conventional approach trains large neural network models by providing training input to model training machines organized as multiple replicas that asynchronously update a shared model via a global parameter server. However, this approach deals with the transmission of data samples from the contributor in an asynchronous manner with no relevance to determining whether the system should continue with the federated learning process or wait for more or other contributors to join nor does the conventional approach consider a usefulness of the data samples of the contributors.

In a further example, U.S. Publ. Appln. No. 2019/0050746 describes a federated learning system that includes an on-device machine learning platform for data collection, model training, and use of models. This conventional approach provides a platform that enables participation in the federated learning where the device determines a local update to a model based on locally stored data and then communicates the local update to a cloud service. However, this approach deals with the device specific transmission determinations with no relevance to determining whether the system should continue with the federated learning process or wait for more or other contributors to join nor does the conventional approach consider a usefulness of the data samples of the contributors.

In yet another example, U.S. Publ. Appln. No. 2019/0171978 describes a federated learning system that selects a subset of available clients within a region to participate in the learning process. This conventional approach selects regions based at least in part on a temporal availability of devices of contributors (e.g., geocultural boundaries) that defines the manner in utilizing the federated learning system. However, this approach deals with selection of contributors according to geography with no relevance to determining whether the system should continue with the federated learning process or wait for more or other contributors to join nor does the conventional approach consider a usefulness of the data samples of the contributors.

There are still further conventional approaches that attempt to improve the manner in which federated learning systems are utilized. A first further conventional approach describes a federated learning system with a focus on how to control a trade-off between local computation and global communication. A second further conventional approach describes a demonstration of a federated learning system where devices associated with contributors may get connected and disconnected over time to describe how the federated learning system may be a resource-constrained networked environment. A third further conventional approach describes a federated learning system involving mobile devices and how energy may be optimized. Additional publications related to federated learning may describes the various federated learning techniques and the challenges with potential solutions of federated learning systems (e.g., opportunistically perform federated learning with currently available contributors but which leads to overfitting to a small number of data samples and training instability). However, these approaches and descriptions do not describe determining whether the system should continue with the federated learning process or wait for more or other contributors to join nor does the conventional approach consider a usefulness of the data samples of the contributors.

SUMMARY

The exemplary embodiments disclose a method, a computer program product, and a computer system for determining when to perform a federated learning process. The method comprises identifying currently available contributors among contributors of a federated learning task for which the federated learning process is to be performed. The method comprises determining a usefulness metric of the currently available contributors for respective datasets from each of the currently available contributors used in performing the federated learning process. The method comprises, as a result of the usefulness metric of the currently available contributors being at least a usefulness threshold, generating a recommendation to perform the federated learning process with the datasets of the currently available contributors. The method comprises transmitting the recommendation to a processing component configured to perform the federated learning process.

In a preferred embodiment, the method further comprises, as a result of the usefulness metric of the currently available contributors being less than the usefulness threshold, generating a further recommendation to perform the federated learning process after a time duration.

In a preferred embodiment, the method further comprises determining a further usefulness metric of the currently unavailable contributors for respective further datasets from each of the currently unavailable contributors and determining a predicted availability of select ones of the currently unavailable contributors who have the further usefulness metric being at least the usefulness threshold.

In a preferred embodiment, the time duration is based on the predicted availability of currently unavailable contributors among the contributors.

In a preferred embodiment, the predicted availability is based on a temporal characteristic, a spatial characteristic, or a combination thereof associated with the unavailable contributors, the available contributors, or a combination thereof.

In a preferred embodiment, the usefulness metric is based on a contribution impact to the federated learning process, a complementary nature of the datasets to the federated learning process, a space associated with a global model generated by the federated learning process, a diversity of the datasets, characteristics of the federated learning task, or a combination thereof.

In a preferred embodiment, the usefulness metric includes a local usefulness metric, a global usefulness metric, or a combination thereof, and the usefulness threshold includes a local usefulness threshold, a global usefulness threshold, or a combination thereof, respectively.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
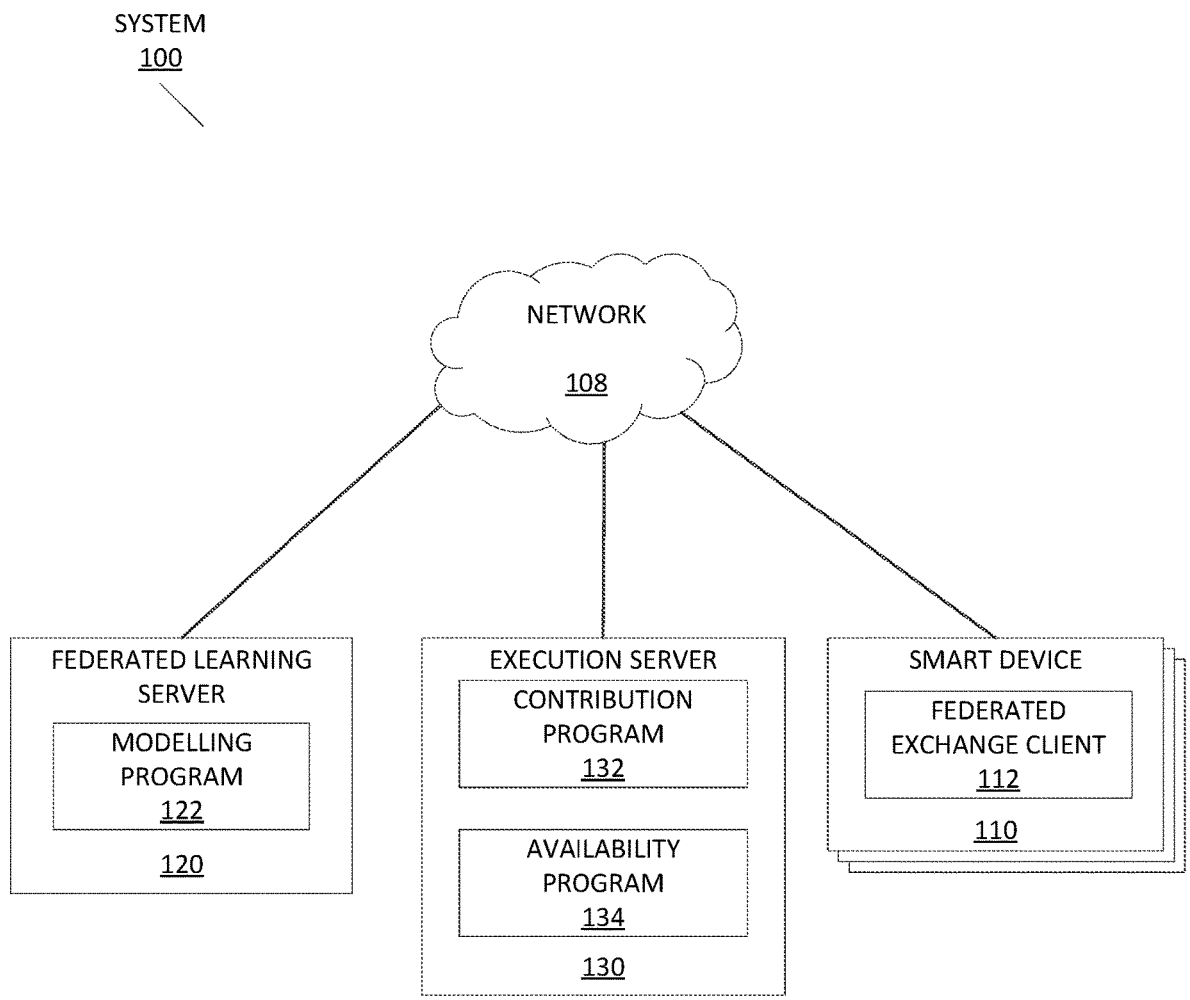
FIG. 1 depicts an exemplary schematic diagram of a federated learning system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for determining when to perform a federated learning process. As will be described in greater detail herein, the exemplary embodiments may balance a plurality of factors in determining when the federated learning process is to be performed. The exemplary embodiments may consider a usefulness of data samples of contributors to determine whether the federated learning process is to be performed. The exemplary embodiments may also consider a time to wait for further data samples of unavailable contributors based on a predicted availability of the contributors. Key benefits of the exemplary embodiments may include improving an efficiency that the federated learning process is performed while reducing costs associated with each iteration of the federated learning process from performing the federated learning process at opportunistic times. Detailed implementation of the exemplary embodiments follows.

The exemplary embodiments are described with regard to a federated learning process and determining a usefulness of data samples from currently available contributors along with a predicted availability of the unavailable contributors in determining when to perform the federated learning process. However, the exemplary embodiments may be applied and/or modified for other processes that weight trade-offs between performing the process and waiting to perform the process. The exemplary embodiments may also consider further factors in lieu of or in addition to usefulness of the data samples in determining when to perform the federated learning process.

FIG. 1 depicts a federated learning system 100, in accordance with the exemplary embodiments. According to the exemplary embodiments, the federated learning system 100 may include one or more smart devices 110, a federated learning server 120, and an execution server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the federated learning system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the federated learning system 100 that do not utilize the network 108.

In the exemplary embodiments, the smart device 110 may include a federated exchange client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 3, as part of a cloud implementation with reference to FIG. 4, and/or as utilizing functional abstraction layers for processing with reference to FIG. 5.

The smart device 110 is shown with the federated exchange client 112. However, the smart device 110 may include further clients and/or programs (not shown) that are directed toward the local processing to train local models on local data samples. As the exemplary embodiments may be directed toward any purpose for which the federated learning is to be used, the further clients and/or programs may perform corresponding operations in furtherance of generating datasets based on the trained local models and the local data samples that are used in the federated learning process.

In the exemplary embodiments, the federated exchange client 112 may act as a client in a client-server relationship and may be a software, hardware, and/or firmware based application utilized by a contributor of the federated learning for exchanging datasets used in generating a global model through a federated learning process via the network 108. In embodiments, the federated exchange client 112 may operate as a user interface allowing the user of the smart device 110 to interact with one or more components of the federated learning system 100, and utilize various wired and/or wireless connection protocols for data transmission and exchange associated with establishing and performing a communication session, including Bluetooth, 2.4 gHz and 5 gHz Internet, near-field communication, Z-Wave, Zigbee, etc.

The federated exchange client 112 may be configured to prepare datasets that are to be exchanged for purposes of generating a global model. The federated exchange client 112 may receive the datasets from the further clients and/or programs that train the local models on the local data samples and generate packets of the datasets that are to be transmitted to a further processing component that generates the global model. As will be described in further detail below, the further processing component may be the federated learning server 120. With the exemplary embodiments being directed toward federated learning, the datasets that are prepared may be heterogeneous datasets relative to other smart devices 110 used by respective further contributors of the federated learning.

The smart device 110 and/or the federated exchange client 112 may be configured to establish a connection to the federated learning server 120. For illustrative purposes, the exemplary embodiments are described with regard to the federated exchange client 112 being connected to the federated learning server 120. While the federated exchange client 112 is connected to the federated learning server 120, the contributor associated with the federated exchange client 112 may be designated as a currently available contributor for purposes of performing the federated learning process. While the federated exchange client 112 is disconnected from the federated learning server 120, the contributor associated with the federated exchange client 112 may be designated as an unavailable contributor for purposes of performing the federated learning process. At a subsequent time, the federated exchange client 112 may re-establish a connection to the federated learning server 120 so that the contributor associated with the federated exchange client 112 is designated as a currently available contributor.

In the exemplary embodiments, the federated learning server 120 may include a modelling program 126 and act as a server in a client-server relationship with the federated exchange client 112. The federated learning server 120 may also act as a client in a client-server relationship, as will be described below. The federated learning server 120 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the federated learning server 120 is shown as a single device, in other embodiments, the federated learning server 120 may be comprised of a cluster or plurality of computing devices, working together or working independently. The federated learning server 120 is described in greater detail as a hardware implementation with reference to FIG. 3, as part of a cloud implementation with reference to FIG. 4, and/or as utilizing functional abstraction layers for processing with reference to FIG. 5.

The exemplary embodiments are described where the federated learning process is performed through a centralized server. Thus, in the federated learning system 100 of FIG. 1, the federated learning server 120 may be the centralized server performing the federated learning process. Accordingly, the federated learning server 120 may be configured to orchestrate the various operations towards generating the global model. However, those skilled in the art will appreciate that the federated learning process may be performed without the centralized server. For example, there may be a peer-to-peer approach in performing the federated learning process where no centralized server is used. Thus, in another exemplary embodiment, the federated learning server 120 may represent a collective mechanism utilizing the peer-to-peer approach in performing the federated learning process (e.g., collectively by one or more of the smart devices 110 associated with respective one or more contributors of the federated learning). Accordingly, the federated learning server 120 may be incorporated, for example, in one or more of the smart devices 110.

In the exemplary embodiments, the modelling program 122 may be configured to perform the federated learning process based on datasets received from the plurality of smart devices 110 associated with respective contributors while the contributors are currently available. In performing the federated learning process, the modelling program 122 may generate a global model directed toward the purpose of the federated learning. The modelling program 122 may utilize any federated learning process in generating the global model. For example, with the federated learning server 120 being a centralized server in the federated learning, the modelling program 122 may be configured with a central orchestrator setup. In the central orchestrator setup, the modelling program 122 may select a statistical model to be trained, transmit an initial model to the smart devices 110 such that the federated exchange clients 112 train the model locally with local data samples, and receive model results to generate a global model without requiring access to the underlying data samples.

In the exemplary embodiments, the execution server 130 may include a contribution program 132 and an availability program 134 and act as a server in a client-server relationship with the modelling program 122. The execution server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the execution server 130 is shown as a single device, in other embodiments, the execution server 130 may be comprised of a cluster or plurality of computing devices, working together or working independently. While the execution server 130 is also shown as a separate component, in other embodiments, the operations performed by the execution server 130 may be incorporated with one or more of the other components of the federated learning system 100. For example, the execution server 130 may be incorporated in the federated learning server 120. The execution server 130 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the contribution program 132 may be a software, hardware, and/or firmware application configured to determine a usefulness of the dataset that the federated exchange clients 112 may provide for the federated learning process performed by the modelling program 122. According to the exemplary embodiments, the contribution program 132 may determine a timing of when to perform the federated learning process based on the contribution of the contributors participating in the federated learning. As will be described below, the usefulness of the contribution may be related to additional information collected about the contributor (e.g., location information, the further clients and/or programs on the smart devices 110 involved in local processing to generate the datasets, other pertinent information on the smart devices 110, etc.).

When the federated learning process is to be performed, to improve an efficiency with which the federated learning process is performed (e.g., reducing wasted processing, generating a global model with a more comprehensive and impactful collection of datasets, etc.), the subset of contributors who are currently active or connected need to have datasets that provide a good representation of the entire input space of the global model that is to be trained by the modelling program 122. For example, the union of all the contributors' datasets should include all the possible outputs (e.g., predicated labels) of the global model. For any given subset of currently available contributors, the contribution program 132 may define a usefulness metric of performing the federated learning process on this subset of contributors. The usefulness metric may be determined by considering distances between features extracted from different local datasets of the contributors (e.g., in a holistic manner relative to the global model). An overall usefulness may be high when the currently available contributors provide datasets that cover a large space and different contributors provide datasets that are complementary with each other. The overall usefulness may be low when the currently available contributors provide datasets that cover a small space and different contributors provide datasets that are similar with each other.

The contribution program 132 may utilize a local usefulness threshold and a global usefulness threshold in determining the usefulness metric for the currently available contributors. The local usefulness threshold may be applicable to a local usefulness metric associated with an individual contributor. The contribution program 132 may determine a local usefulness metric for this contributor and determine whether the contributor has a sufficient usefulness based on the local usefulness metric being at least the local usefulness threshold. For example, if the dataset from the contributor provides a dataset that is redundant or comparable with previously submitted datasets from the contributor, the local usefulness metric may be less than the local usefulness threshold such that the contributor is designated as having an insufficient usefulness in the current instance. If the dataset from the contributor provides a dataset that has a relatively large impact in generating the global model, the local usefulness metric may be at least the local usefulness threshold such that the contributor is designated as having a sufficient usefulness in the current instance.

The global usefulness threshold may be applicable to a global usefulness metric associated with the contributors relative to one another as applicable to generating the global model. The contribution program 132 may determine a global usefulness metric for each of the currently available contributors based on an overall coverage of the space associated with the global model as well as based on the complementary nature that the datasets have with one another. In this manner, the contribution program 132 may determine whether the currently available contributors have a sufficient usefulness based on the global usefulness metric being at least the global usefulness threshold. For example, if the datasets from the currently available contributors provide datasets that covers a small space and/or is similar to one another, the global usefulness metric may be less than the global usefulness threshold such that the currently available contributors are designated as having an insufficient usefulness in the current instance. If the dataset from the currently available contributors provide datasets that cover a large space and/or is complementary to one another, the global usefulness metric may be at least the global usefulness threshold such that the currently available contributors are designated as having a sufficient usefulness in the current instance.

In determining the usefulness of individual currently available contributors and the currently available contributors as a whole, the contribution program 132 may utilize the local usefulness metric, the global usefulness metric, or a combination thereof. For example, the contribution program 132 may determine that the currently available contributors have a sufficient usefulness to perform the federated learning process when a predetermined number of contributors satisfy the local usefulness threshold. In another example, the contribution program 132 may determine that the currently available contributors have a sufficient usefulness to perform the federated learning process when the global usefulness threshold is satisfied. In a further example, the contribution program 132 may determine that the currently available contributors have a sufficient usefulness to perform the federated learning process when the predetermined number of contributors satisfy the local usefulness threshold and the global usefulness threshold is satisfied.

When the contribution program 132 determines that the currently available contributors have a sufficient usefulness to perform the federated learning process, the contribution program 132 may determine that the modelling program 122 should perform the federated learning process based on the datasets of the currently available contributors. However, when the contribution program 132 determines that the currently available contributors have an insufficient usefulness to perform the federated learning process, the contribution program 132 may determine that the modelling program 122 should hold on performing the federated learning process and wait for more and/or different contributors to become available.

As will be described in further detail below, the time to wait to perform the federated learning process may depend on a predicted availability of one or more currently unavailable contributors and may vary over time depending on the predicted availability. In this manner, the contribution program 132 and/or the availability program 134 may dynamically determine when and for how long to wait to perform the federated learning process based on the current state of the federated learning system 100. The contribution program 132 may receive information from the availability program 134 and collaborate in determining when and for how long to recommend waiting to perform the federated learning process. For example, the contribution program 132 and the availability program 134 may rely on a waiting threshold so that the modelling program 122 is not unduly waiting a relatively long time to perform the federated learning process. Thus, if the determined time to wait is at least the waiting threshold, the contribution program 132 and the availability program 134 may instruct the modelling program 122 to proceed with performing the federated learning process with a lesser number of contributors and/or less useful datasets within the waiting threshold.

The contribution program 132 may also be configured to determine the usefulness of unavailable contributors. The usefulness of the unavailable contributors may provide insight regarding when and for how long to wait in performing the federated learning process, particularly when the currently available contributors do not satisfy the usefulness conditions to perform the federated learning process. The contribution program 132 may determine the usefulness of unavailable contributors based on various information. For example, the contribution program 132 may determine the usefulness of the unavailable contributors based on historical contributions. The contribution program 132 may determine a relative impact that the unavailable contributor has had in providing datasets to generate the global model. In another example, the contribution program 132 may determine the usefulness of the unavailable contributors based on the further clients and/or applications that are running towards the federated learning. The contribution program 132 may predict the types of information in the datasets that would be provided by the unavailable contributors to determine the relative usefulness of the unavailable contributors. In a further example, the contribution program 132 may determine the usefulness of the unavailable contributors based on a complementary nature of the datasets that may be provided and/or a space associated with generating the global model that expected datasets may cover. In this manner, the contribution program 132 may predict the impact that the unavailable contributors may have on the federated learning process.

According to an exemplary embodiment, the contribution program 132 may characterize the contributions of the contributors in determining the usefulness in an individual capacity and as a whole. Thus, in furtherance to the mechanisms described above in determining the usefulness of the available and unavailable contributors, the contribution program 132 may utilize various characterizations. For example, if a contributor has a high contribution to the global model (e.g., increase model accuracy by at least a predetermined amount), the contribution program 132 and the availability program 134 may determine that a longer waiting time is warranted to wait for this contributor to become available. The contribution of a single contributor may be quantified by comparing different features that are extracted from local data of the contributor and a validation dataset. For example, the distance of features of the dataset from the contributor and the validation dataset may not be too large or too small. The features of the dataset may include, for example, an output from lower layers of a cellular neural network (CNN) or a deep neural network, a gradient of a model parameter, a gradient computed on a minibatch of training data during a model training process, etc. The validation dataset may be related to the requested of the federated learning task providing a labelled validation dataset as examples of the type of data that is desired for the model to classify.

In another example, if a set of contributors (e.g., two or more) show high benefits or usefulness by providing respective datasets in training the global model together (e.g., two contributors have complementary datasets), the contribution program 132 and the availability program 134 may determine to wait until the set of contributors are available at the same time. For example, the contribution program 132 may determine a collaborative training usefulness metric in which a plurality of collaborative contributors benefit from each other. The contribution program 132 may determine collaborative training usefulness metric based on a pairwise distance between features extracted from datasets of two of the plurality of collaborative contributors. A relatively large distance may correspond to more diverse datasets at the two collaborative contributors such that the contribution program 132 may determine that these collaborative contributors are more likely to bring novelty and benefit to each other (e.g., increasing a space associated with the global model, decreasing an overlap of the datasets, etc.).

In a further example, the contribution program 132 may characterize the usefulness of the contributors based on external information. The external information may include, for example, a physical location, applications installed on the respective smart devices 110, etc. The contribution program 132 may use the external information in a variety of ways that directly or indirectly impact usefulness and/or availability. For example, a federated learning task may be interested in datasets collected by a specific application of contributors at a specific location.

Through the various mechanisms in determining the usefulness of the contributors, the contribution program 132 may be configured to determine the usefulness metric (e.g., local and/or global) by aggregating the contributions of the contributors. The aggregation of the contributions may form at least a partial basis upon which the contribution program 132 and the availability program 132 determine when and for how long the modelling program 122 is to wait in performing the federated learning process.

In the exemplary embodiments, the availability program 134 may be a software, hardware, and/or firmware application configured to determine a predicted availability of unavailable contributors. According to the exemplary embodiments, the availability program 134 may provide information regarding a predicted availability of unavailable contributors where this information is used in a collaborative effort with the usefulness information of the available and unavailable contributors as determined by the contribution program 132.

The availability program 134 may determine the predicted availability based on various information. According to the exemplary embodiments, the availability program 134 may track predicted availability according to a temporal and a spatial characteristic of the contributors. For example, for the temporal characteristic, the availability program 134 may monitor and track each contributor individually. The availability program 134 may then forecast a connection pattern and/or a connection behaviour in time. The connection pattern/behaviour may include laps of time between two connections or availabilities, duration of a connection or availability, an amount of resource availability to participate in the federated learning process, etc. The availability program 134 may have an expectation of determining the temporal correlation based on the connection pattern. For example, the availability may be based on the fact that a contributor charges the smart device 110 and becomes available every day around the same hours, a battery of the smart device 110 lasting for a similar amount of time each day, etc.

In another example, for the spatial characteristic, the availability program 134 may monitor spatial correlations between the smart devices 110 of the contributors. The availability program 134 may utilize the spatial correlations to predict when a specific set of contributors are available at the same time and understand if there is any correlation between the availability of the contributors. One skilled in the art will appreciate that the spatial correlation may be important for the exemplary embodiments as some contributors may have complementary datasets and consequently need the datasets to train the global model at the same time.

Based on the temporal and spatial information of the contributors, the availability program 134 may provide information that is used collaboratively with the information of the contribution program 132 to predict whether it is worth waiting for a contributor according to the contributor's predicted availability when currently unavailable as well as predictors of further contributors.

As a result of determining that the federated learning process is to be delayed (e.g., the currently available contributors do not have a sufficient usefulness in their datasets that are to be used in the federated learning process), as described above, the availability program 134 may determine when unavailable contributors are predicted to become available. The availability program 134 may also determine when currently available contributors remain available that may affect how long to wait before instructing the modelling program 122 to perform the federated learning process. For example, the contribution program 132 may determine that a first contributor and a second contributor provide complementary datasets that are relatively highly impactful in generating the global model by the modelling program 122. Thus, there may be a relatively high benefit in waiting for the first contributor and the second contributor to be available before performing the federated learning process. However, the first contributor and the second contributor may only be available at the same time for certain periods of the day. For example, at a given instance, the first contributor may be available while the second contributor may be unavailable. However, the first contributor may have a predicted unavailability at a subsequent instance. Therefore, it may be prudent for the modelling program 122 to perform the federated learning process while the first contributor is still available based on the predicted unavailability and when the second contributor becomes available based on the predicted availability. The availability program 134 may therefore determine the predicted unavailability of the currently available contributors as well as the predicted availability of the unavailable contributors.

Figure 2:
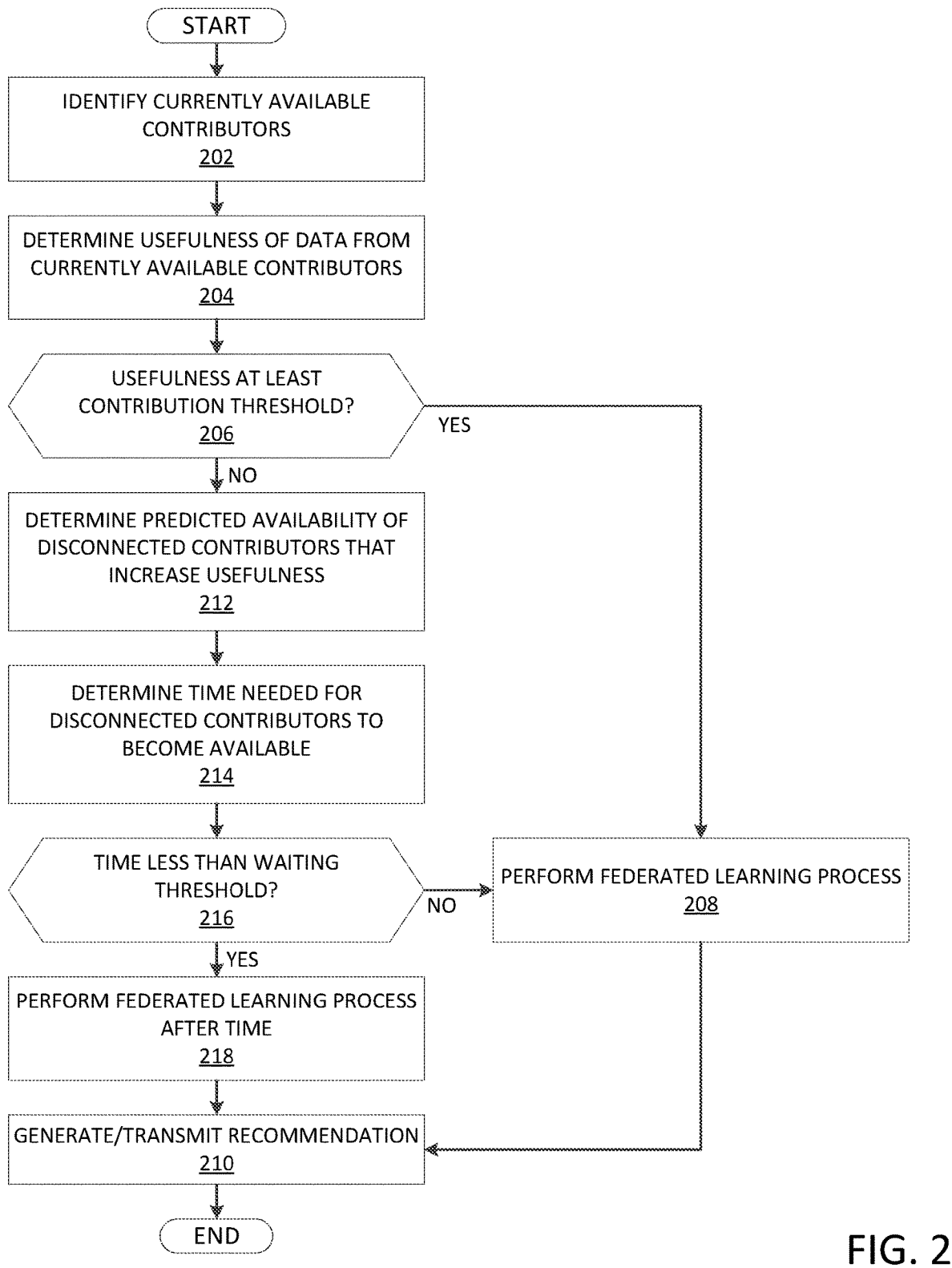
FIG. 2 depicts an exemplary flowchart of a method illustrating the operations of a contribution program 132 of the federated learning system 100 in determining when to perform a federated learning process, in accordance with the exemplary embodiments.

FIG. 2 illustrates an exemplary flowchart of a method 200 illustrating the operations of the contribution program 132 of the federated learning system 100 in determining when to perform a federated learning process, in accordance with the exemplary embodiments. The method 200 is described with regard to the exemplary embodiment illustrated in FIG. 1 in which the federated learning is performed using a centralized server embodied as the federated learning server 120. The method 200 is described from the perspective of the execution server 130 including the contribution program 132 and the availability program 134 in recommending to the modelling program 122 a timing of performing the federated learning process. Thus, in describing the method 200 according to the execution server, the individual operations may relate to the contribution program 132 and/or the availability program 134 as described above.

The execution server 130 may identify currently available contributors (step 202). At a given moment, the execution server 130 may determine which of the contributors are currently available with datasets that may be used in performing the federated learning process. For example, the execution server 130 may determine if the smart devices 110 of the contributors are currently active and/or connected to a network (e.g., a free to use network such as WiFi). For those smart devices 110 that are currently connected, the execution server 130 may determine the corresponding contributors associated with these smart devices 110 in determining the currently available contributors.

To further illustrate the operations of the delegation program 134, reference is now made to an illustrative exemplary embodiment. According to the illustrative exemplary embodiment, the federated learning task may include a plurality of contributors. For example, for the illustrative exemplary embodiment, there may be five total contributors. Those skilled in the art will understand that the federated learning task may include a significantly higher number of contributors. However, for ease of describing the method 200 and the exemplary embodiments, the entire set may be limited to five contributors. At the moment that the execution server 130 identifies the currently available contributors based on a connection to a free to use network, the execution server 130 may determine that a first, a second, and a third contributor are currently available while a fourth and a fifth contributor are unavailable.

The execution server 130 may determine a usefulness of the datasets that are provided by the currently available contributors (step 204). For example, the execution server 130 may utilize a local and/or a global usefulness metric relative to a local and/or global usefulness threshold, respectively. The execution server 130 may determine the local and global usefulness metric in a variety of different according to a variety of different factors. For example, in using the local usefulness metric, the execution server 130 may determine whether one of the currently available contributors has a high contribution toward generating the global model (e.g., increasing a model accuracy by a significant amount in using the dataset of the currently available contributor). In another example, in using the global usefulness metric, the execution server 130 may determine a total contribution from the currently available contributors toward generating the global model. In a further example, the execution server 130 may determine whether the currently available contributors have complementary datasets and/or increase a space associated with the global model (e.g., diverse datasets). In determining these various factors, the execution server 130 may determine a local and an overall usefulness of the currently available contributors individually and as a whole.

The execution server 130 may determine whether the usefulness of the currently available contributors satisfies a contribution threshold (decision 206). The contribution threshold may be a determination based on the local usefulness threshold, the global usefulness threshold, or a combination thereof. As a result of the contribution threshold being satisfied (decision 206, "YES" branch), the execution server 130 may determine that the federated learning process is to be performed while the currently available contributors remain available (step 208). The execution server 130 may then generate and transmit the recommendation that the federated learning process is to be performed to the modelling program 122 (step 210). As a result of the contribution threshold not being satisfied (decision 206, "NO" branch), the execution server 130 may determine that the federated learning process is to be on hold and perform subsequent operations in determining when and for how long the hold on the federated learning process is to last.

According to the previously introduced exemplary embodiment, the execution server 130 may determine the usefulness of the currently available contributors in an individual capacity and as a whole. In making this determination, the execution server 130 may determine that the first, second, and third contributors may individually provide contributions to generating the global model where the local usefulness metric from each of the currently available contributors satisfies the local usefulness threshold. However, the degree to which the local usefulness metric for each of the currently available contributors is relatively near the local usefulness threshold. In determining the global usefulness metric of the currently available contributors, the execution server 130 may determine that the global usefulness metric does not satisfy the global usefulness threshold. In determining the usefulness in an individual and holistic manner, the execution server 130 may determine that the currently available contributors have an insufficient usefulness to perform the federated learning process.

The execution server 130 may determine a predicated availability of unavailable contributors (step 212). For example, the unavailable contributors may be disconnected at the time that the execution server 130 identified the currently available contributors (e.g., no network connection). In identifying the currently available contributors, the execution server 130 may have also indirectly identified the unavailable contributors. For each unavailable contributor, the execution server 130 may determine a predicted usefulness of the unavailable contributors based on various ways. For example, the execution server 130 may consider historical contributions from the unavailable contributors. In another example, the execution server 130 may determine a predicted contribution from the unavailable contributors (e.g., an occupation of the space associated with the global model, a complementary nature of the datasets from the unavailable contributors, etc.). In determining the predicated availability of the unavailable contributors, the execution server may determine a time needed for the unavailable contributors who may increase a usefulness toward generating the global model become available (step 214). The execution server 130 may determine the time for the predicted availability based on various factors. For example, the execution server 130 may determine a temporal characteristic (e.g., availability patterns throughout a day), a spatial characteristic (e.g., correlation between connectivity with other contributors), further information of the unavailable contributors (e.g., applications that are installed and used in generating the datasets used in generating the global model), etc.

With reference again to the previously introduced exemplary embodiment, the execution server 130 may determine that the fourth contributor provides a relatively high contribution in a local and a global manner, particularly when the dataset from the fourth contributor is used along with the dataset from the third contributor (e.g., the datasets from these contributors are complementary and diverse). Thus, the execution server 130 may determine when the fourth contributor is predicted to be available based on a connection behaviour. For example, the execution server 130 may determine that the fourth contributor is expected to become available in about two hours from a current time.

The execution server may determine whether the time for the predicted availability is within a waiting threshold (decision 216). The execution server 130 may be configured to determine when and how long to wait according to the usefulness of the contributors who are available but may also incorporate a trade-off in the duration of the waiting period. For example, if the execution server 130 were to unduly wait a prolonged period of time, the efficiency or expected improvement to perform the federated learning process may be offset by the decreased frequency in performing the federated learning process from waiting too long. In such an instance, the execution server 130 may determine that the performance of the federated learning process is warranted from using the datasets that are available now or within a waiting period that does not exceed the waiting threshold. Thus, if the time for the predicted availability is at least the waiting threshold (decision 216, "NO" branch), the execution server 130 may determine that the federated learning process is to be performed (step 208) such that the execution server 130 generates and transmits the recommendation to the modelling program 122 (step 210). The execution server 130 may also determine a minimum amount of time to wait if there exists a condition that may change with regard to the usefulness where the minimum amount of time is within the waiting threshold but the overall expected usefulness does not rise to the degree in waiting the time for the predicted availability. If the time for the predicted availability is less than the waiting threshold (decision 216, "YES" branch), the execution server 130 may perform the federated learning process after the time corresponding to the predicted availability (step 218).

In continuance of the illustrative exemplary embodiment, the execution server 130 may determine that the waiting threshold is set to four hours. Thus, the execution server 130 may determine that a previous performance of the federated learning process and a next performance of the federated learning process is not to exceed four hours to maintain a minimum level of efficiency in the federated learning. As described above, the fourth contributor may be predicted to become available in two fours from a current time. In the illustrative exemplary embodiment, the execution server 130 may also be performing the method 200 after a federated learning process has been completed. However, the execution server 130 may perform the method 200 at various times and utilize a timestamp of a completion of an immediately prior performance of the federated learning process in processing the waiting threshold. In this instance, the time for the predicted availability of the fourth contributor may be determined to be within the waiting threshold. Furthermore, the execution server 130 may determine that the third contributor has a time to a predicted unavailability in about three hours. Thus, when the fourth contributor becomes available, the third contributor may still be available. The execution server 130 may therefore determine that the modelling program 122 should wait at least two hours but less than three hours to perform the next federated learning process, at a time when both the third contributor and the fourth contributor are both available. The execution server 130 may also determine that an unavailability of the first and second contributors as well as an availability of the fifth contributor may not impact the performance of the federated learning process to a sufficient degree relative to the impact of having both the third and fourth contributors available at the same time. Thus, the execution server 130 may incorporate these determinations as well in determining the time to wait in performing the federated learning process. The execution server 130 may then generate and transmit a recommendation to the modelling program 122 to wait at least two hours for the fourth contributor but to perform the federated learning process within three hours prior to the third contributor being predicted to be unavailable.

The exemplary embodiments are described with the execution server 130 generating and transmitting a recommendation to the modelling program 122 as to when to perform the federated learning process. However, in further exemplary embodiments, the execution server 130 may have more control with regard to when to perform the federated learning process. For example, when operations of the execution server 130 are incorporated in the federated modelling server 120, the execution server 130 may instead generate an instruction that defines when the modelling program 122 performs the federated learning process.

The exemplary embodiments are also described with regard to the usefulness threshold (e.g., local and/or global) being set to a predetermined value. However, the exemplary embodiments may modify the usefulness threshold to be dynamic and/or adaptable according to the conditions being experienced by the federated learning system 100. For example, the contribution program 132 may have determined that the global usefulness metric has been below the global usefulness threshold for a predetermined duration of time. As a result of such a condition, the contribution program 132 may select to modify the global usefulness threshold (e.g., lower the usefulness threshold). In another example, the contribution program 132 may adjust the usefulness threshold (e.g., local and/or global) to depend on the nature or characteristics of the federated learning task. Thus, the contribution program 132 may select a corresponding usefulness threshold based upon the type of the federated learning task (e.g., image classification, sound classification, etc.). Accordingly, the contribution program 132 may modify the basis upon which the federated learning process is determined to be performed according to the conditions being experienced by the federated learning system 100, the conditions of the federated learning task being performed by the federated learning system 100, etc.

The exemplary embodiments are configured to determine when to perform a federated learning process. The exemplary embodiments may utilize a usefulness metric to determine whether currently available contributors provide datasets that warrant performing the federated learning process. When the usefulness metric is at least a usefulness threshold, the exemplary embodiments may determine that performing the federated learning process may generate or update a global model in an impactful manner. The exemplary embodiments are further configured to determine whether the federated learning process is to be postponed as a result of the usefulness metric not meeting the usefulness threshold. Based on this determination, the exemplary embodiments may determine a time that the federated learning process is to be postponed based on a predicted availability of unavailable contributors, particularly those unavailable contributors that may impact the global model in an individual and/or a holistic capacity.

Figure 3:
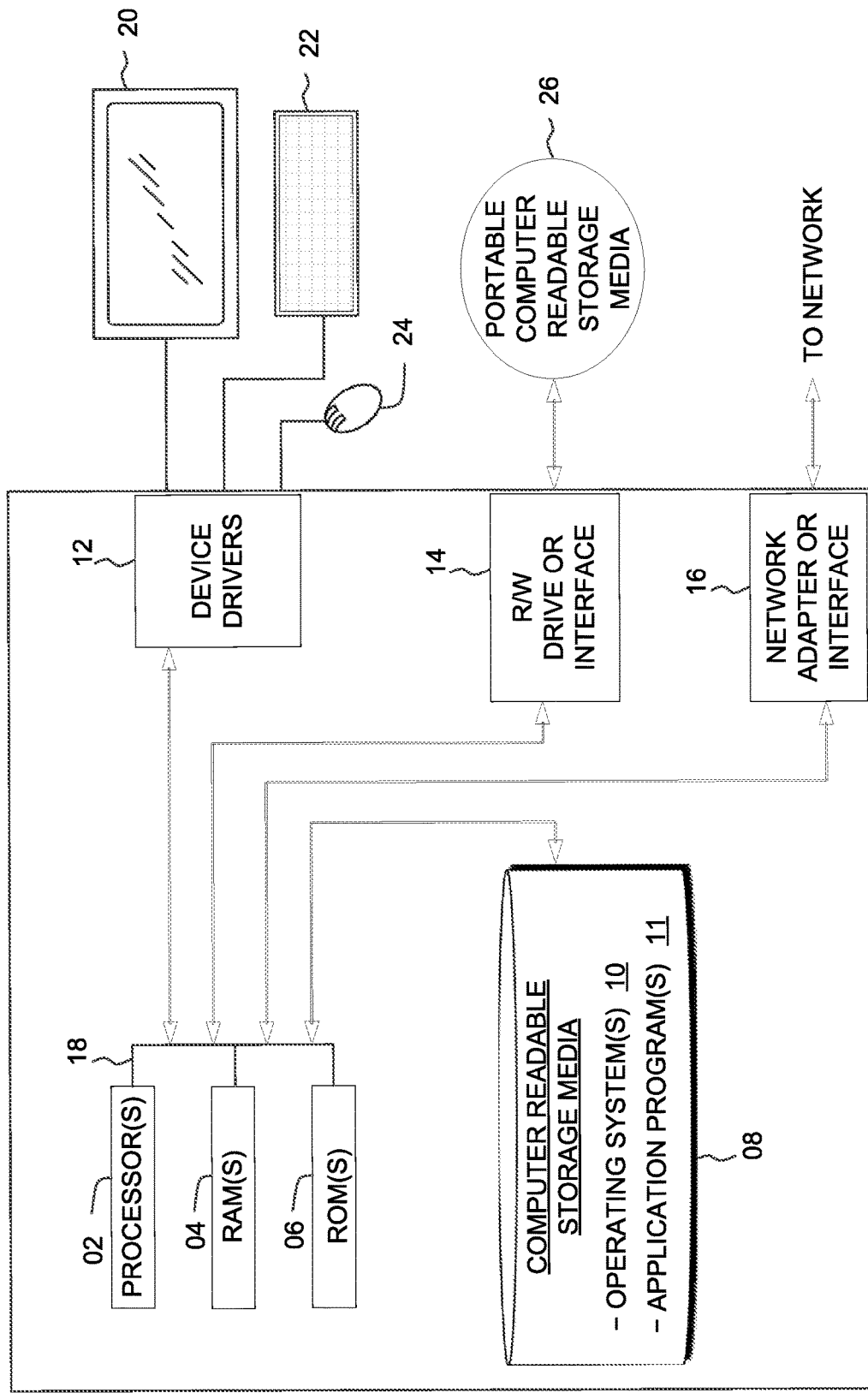
FIG. 3 depicts an exemplary block diagram depicting the hardware components of the federated learning system 100 of FIG. 1, in accordance with the exemplary embodiments.

FIG. 3 depicts a block diagram of devices within the federated learning system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
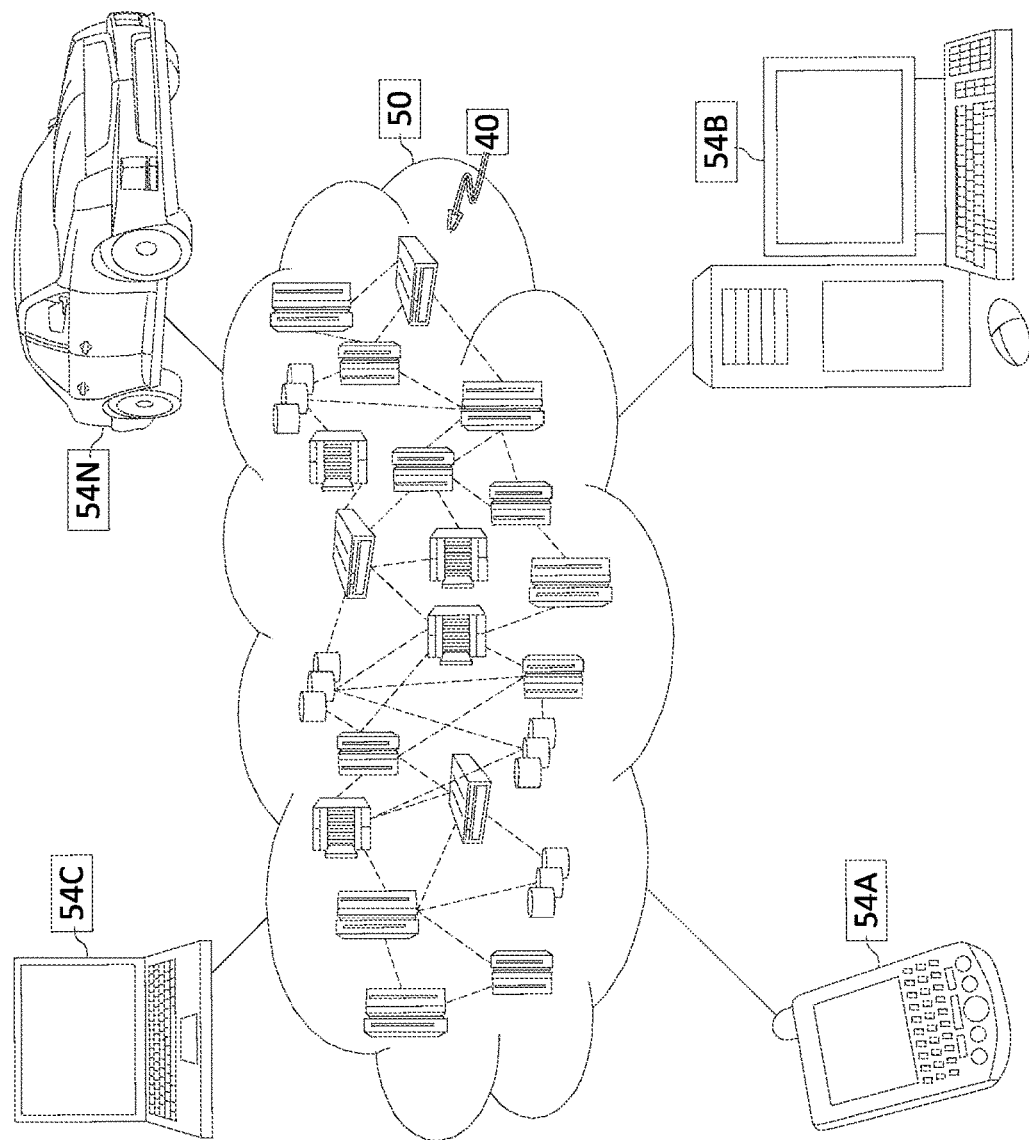
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
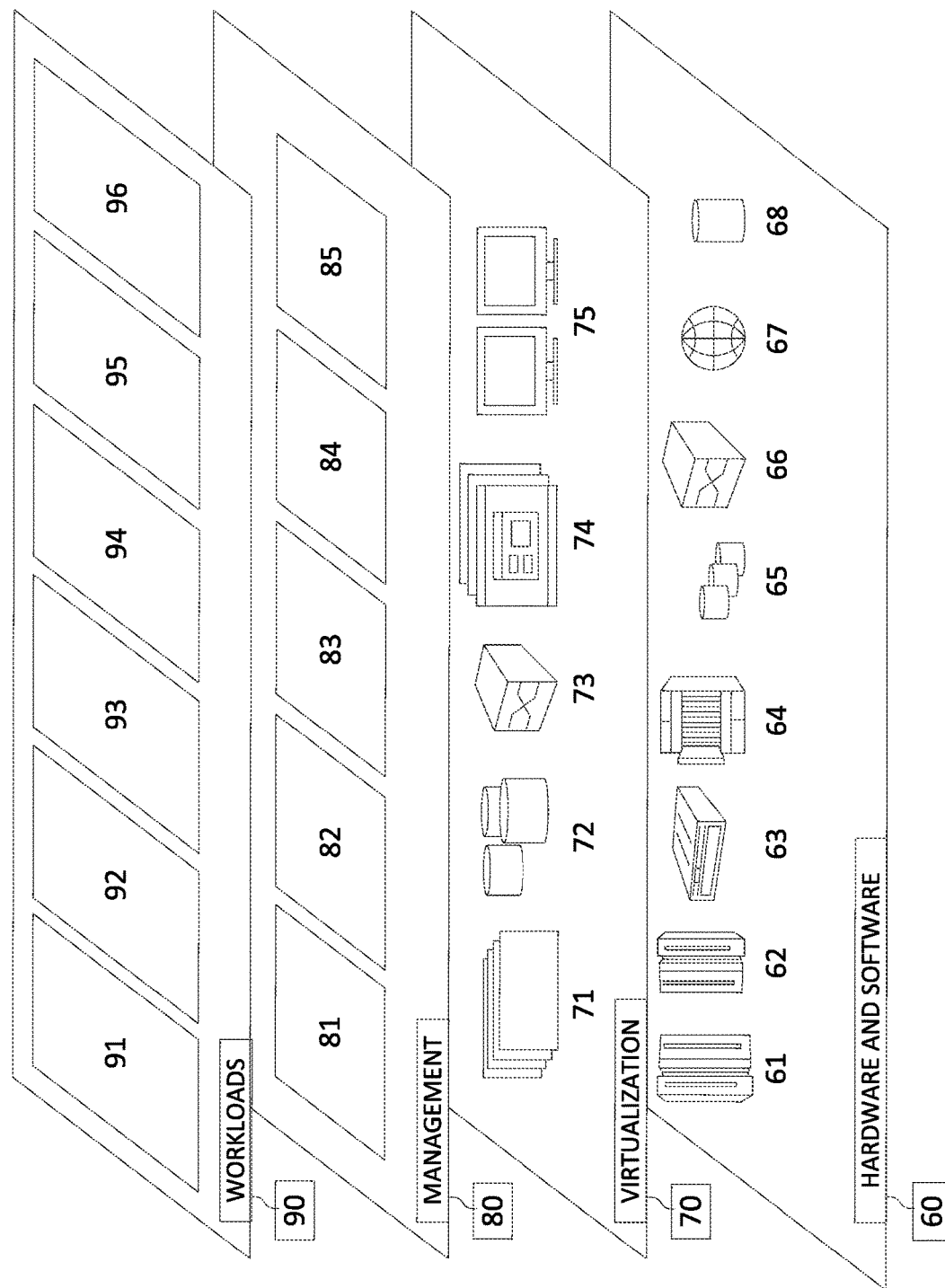
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and transfer processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for determining when to perform a federated learning process, the method comprising:

identifying currently available contributors among contributors of a federated learning task for which the federated learning process is to be performed;

determining a usefulness metric of the currently available contributors for respective datasets from each of the currently available contributors used in performing the federated learning process;

as a result of the usefulness metric of the currently available contributors being at least a usefulness threshold, generating a recommendation to perform the federated learning process with the datasets of the currently available contributors; and transmitting the recommendation to a processing component configured to perform the federated learning process.

2. The computer-implemented method of claim 1, further comprising:

as a result of the usefulness metric of the currently available contributors being less than the usefulness threshold, generating a further recommendation to perform the federated learning process after a time duration.

3. The computer-implemented method of claim 2, further comprising:

determining a further usefulness metric of currently unavailable contributors for respective further datasets from each of the currently unavailable contributors;

determining a predicted availability of select ones of the currently unavailable contributors who have the further usefulness metric being at least the usefulness threshold.

4. The computer-implemented method of claim 3, wherein the time duration is based on the predicted availability of the currently unavailable contributors among the contributors.

5. The computer-implemented method of claim 3, wherein the predicted availability is based on a temporal characteristic, a spatial characteristic, or a combination thereof associated with the currently unavailable contributors, the currently available contributors, or a combination thereof.

6. The computer-implemented method of claim 1, wherein the usefulness metric is based on a contribution impact to the federated learning process, a complementary nature of the datasets to the federated learning process, a space associated with a global model generated by the federated learning process, a diversity of the datasets, characteristics of the federated learning task, or a combination thereof.

7. The computer-implemented method of claim 1, wherein the usefulness metric includes a local usefulness metric, a global usefulness metric, or a combination thereof, and the usefulness threshold includes a local usefulness threshold, a global usefulness threshold, or a combination thereof, respectively.

8. A computer program product for determining when to perform a federated learning process, the computer program product comprising:
one or more non-transitory computer-readable storage media and program instructions collectively stored on the one or more non-transitory computer-readable storage media capable of performing a method, the method comprising:
identifying currently available contributors among contributors of a federated learning task for which the federated learning process is to be performed;
determining a usefulness metric of the currently available contributors for respective datasets from each of the currently available contributors used in performing the federated learning process;
as a result of the usefulness metric of the currently available contributors being at least a usefulness threshold, generating a recommendation to perform the federated learning process with the datasets of the currently available contributors; and
transmitting the recommendation to a processing component configured to perform the federated learning process.

9. The computer program product of claim 8, wherein the method further comprises:
as a result of the usefulness metric of the currently available contributors being less than the usefulness threshold, generating a further recommendation to perform the federated learning process after a time duration.

10. The computer program product of claim 9, wherein the method further comprises:
determining a further usefulness metric of currently unavailable contributors for respective further datasets from each of the currently unavailable contributors;
determining a predicted availability of select ones of the currently unavailable contributors who have the further usefulness metric being at least the usefulness threshold.

11. The computer program product of claim 10, wherein the time duration is based on the predicted availability of the currently unavailable contributors among the contributors.

12. The computer program product of claim 10, wherein the predicted availability is based on a temporal characteristic, a spatial characteristic, or a combination thereof associated with the currently unavailable contributors, the currently available contributors, or a combination thereof.

13. The computer program product of claim 8, wherein the usefulness metric is based on a contribution impact to the federated learning process, a complementary nature of the datasets to the federated learning process, a space associated with a global model generated by the federated learning process, a diversity of the datasets, characteristics of the federated learning task, or a combination thereof.

14. The computer program product of claim 8, wherein the usefulness metric includes a local usefulness metric, a global usefulness metric, or a combination thereof, and the usefulness threshold includes a local usefulness threshold, a global usefulness threshold, or a combination thereof, respectively.

15. A computer system for determining when to perform a federated learning process, the computer system comprising:
one or more computer processors, one or more computer-readable storage media, and program instructions collectively stored on the one or more of the computer-readable storage media for execution by at least one of the one or more processors capable of performing a method, the method comprising:
identifying currently available contributors among contributors of a federated learning task for which the federated learning process is to be performed;
determining a usefulness metric of the currently available contributors for respective datasets from each of the currently available contributors used in performing the federated learning process;
as a result of the usefulness metric of the currently available contributors being at least a usefulness threshold, generating a recommendation to perform the federated learning process with the datasets of the currently available contributors; and
transmitting the recommendation to a processing component configured to perform the federated learning process.

16. The computer system of claim 15, wherein the method further comprises:
as a result of the usefulness metric of the currently available contributors being less than the usefulness threshold, generating a further recommendation to perform the federated learning process after a time duration.

17. The computer system of claim 16, wherein the method further comprises:
determining a further usefulness metric of currently unavailable contributors for respective further datasets from each of the currently unavailable contributors;
determining a predicted availability of select ones of the currently unavailable contributors who have the further usefulness metric being at least the usefulness threshold.

18. The computer system of claim 17, wherein the time duration is based on the predicted availability of the currently unavailable contributors among the contributors.

19. The computer system of claim 17, wherein the predicted availability is based on a temporal characteristic, a spatial characteristic, or a combination thereof associated with the currently unavailable contributors, the currently available contributors, or a combination thereof.

20. The computer system of claim 15, wherein the usefulness metric is based on a contribution impact to the federated learning process, a complementary nature of the datasets to the federated learning process, a space associated with a global model generated by the federated learning process, a diversity of the datasets, characteristics of the federated learning task, or a combination thereof.

* * * * *